Oct. 14, 1969 H. ROSEN 3,472,638
METHOD AND APPARATUS FOR MAKING A CONTRACTION IN THE
BORE OF A GLASS CLINICAL THERMOMETER
Filed Aug. 17, 1967 2 Sheets-Sheet 1

INVENTOR.
H. ROSEN
BY
ATTORNEY

Oct. 14, 1969    H. ROSEN    3,472,638
METHOD AND APPARATUS FOR MAKING A CONTRACTION IN THE
BORE OF A GLASS CLINICAL THERMOMETER
Filed Aug. 17, 1967    2 Sheets-Sheet 2
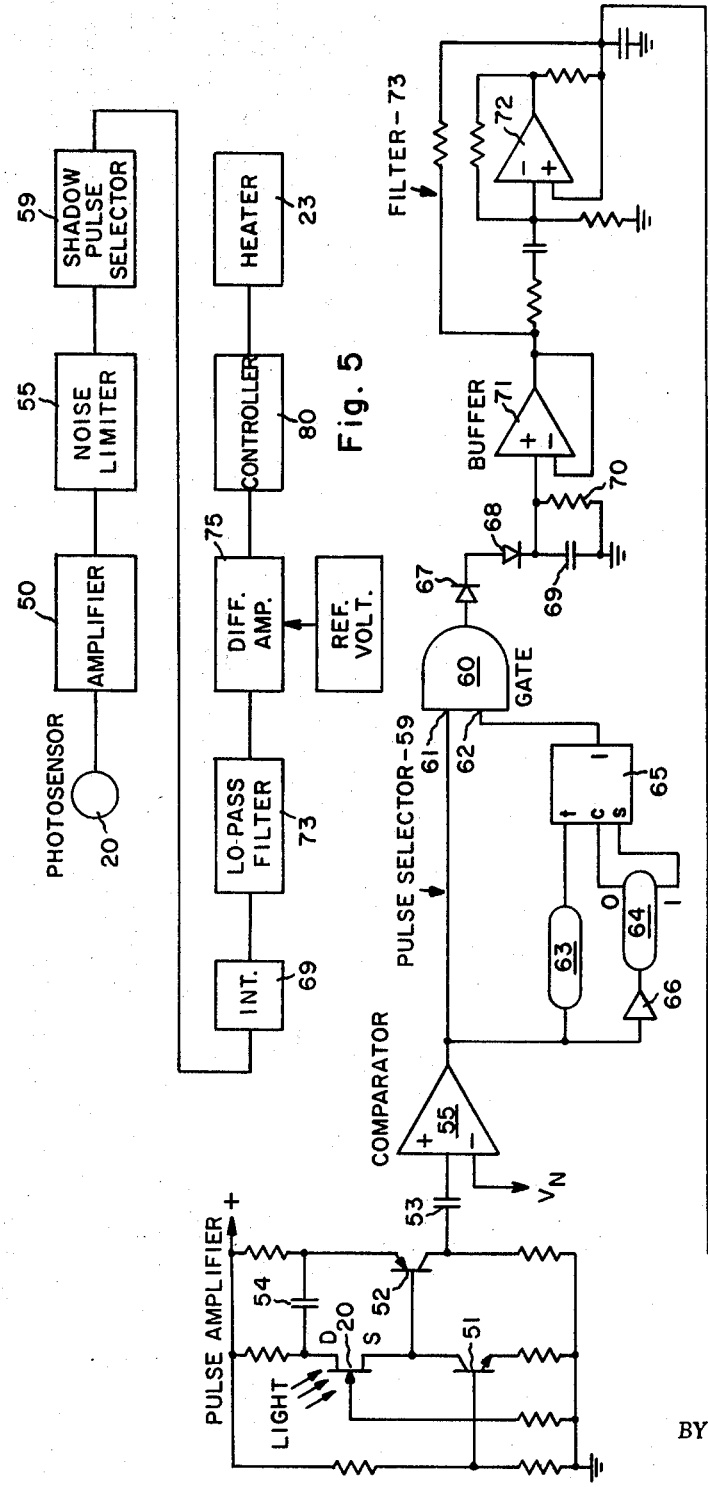
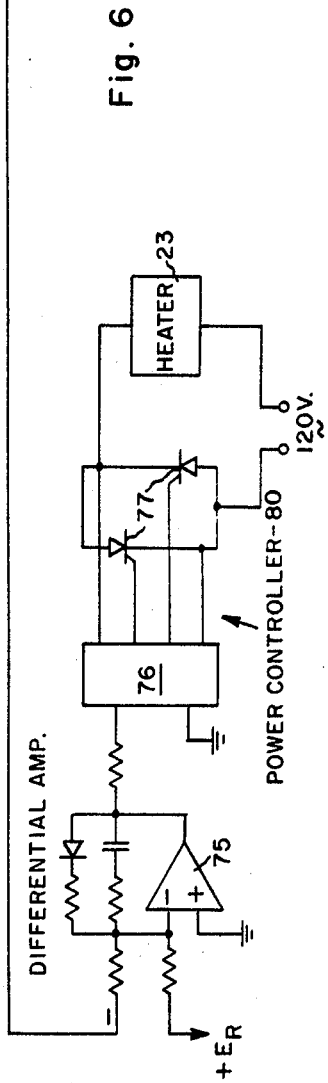
INVENTOR.
H. ROSEN
BY
ATTORNEY //! # United States Patent Office

3,472,638
Patented Oct. 14, 1969

3,472,638
METHOD AND APPARATUS FOR MAKING A CONTRACTION IN THE BORE OF A GLASS CLINICAL THERMOMETER
Harvey Rosen, Valley Stream, N.Y., assignor to Kaye Thermometer Corp., Brooklyn, N.Y., a corporation of New York
Filed Aug. 17, 1967, Ser. No. 661,359
Int. Cl. C03b 19/00
U.S. Cl. 65—29          10 Claims

ABSTRACT OF THE DISCLOSURE

A method and apparatus for making the bore contraction in a glass clinical thermometer in which the shadow image of the bore is projected onto a photosensitive device and the changing electrical output from the latter as the bore walls collapse under heating is used to control the heating.

---

Figure 1:
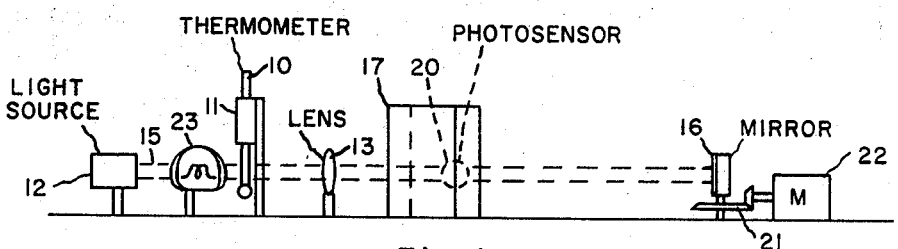

This invention relates to a method of making a thermometer bulb and to apparatus for carrying out the method. In particular, it relates to a method for making in an automatic manner the glass bulb contraction for a clinical thermometer and to apparatus suitable for carrying out the method.

The well-known clinical thermometer comprises a glass bulb with an internal bore containing mercury or other heat-expandable liquid. See, for example, the description in U.S. Patent 3,183,721. It differs from the known air thermometers in that it is a maximum-reading device i.e., the expanded fluid column remains in the highest position reached so that it will still register the maximum reading when removed from contact with the heat source. This is accomplished by providing a contraction in the bore just above the liquid supply which prevents the liquid column from falling except when shaken down. The prior art method for providing the contraction is as follows. The glass tubing with the bore, which generally has an inside diameter of 0.001 inch, while subjected to air pressure, is heated in a flame to blow out a local bore portion forming a small bubble or blister. A bulb is then added, the bore filled with mercury and sealed. Next the mercury is withdrawn from the bore to provide a partial vacuum and the blister reheated in a flame. As the glass softens, the blister walls collapse forming a constriction in the bore. The heating is controlled by the operator while observing the collapsing blister walls to obtain the desired amount of constriction.

The known technique suffers from a number of disadvantages. First, blisters, which should be of uniform size, must be formed in the tubing, which is a difficult operation requiring trained operators. Second, the contraction operation is slow and cumbersome, usually performed manually. Third, even with a highly skilled operator employing expensive equipment, it is difficult to control the amount of constriction and thus the reject rate is high. Fourth, the blister which remains in the tubing holds an appreciable amount of mercury, and changes in its characteristics due to aging change the calibration of the completed thermometer.

One object of the present invention is a method for manufacturing the thermometer tubing of a maximum reading device without the need for first forming a blister.

Another object of the invention is a method for automatically controlling the manufacture of a contraction in glass tubing for a clinical thermometer.

A further object of the invention is apparatus for automatically making the contraction in glass tubing for a clinical thermometer.

These and other objects of the invention as will appear hereinafter are attained as will now be briefly described. The bored tubing with attached bulb and filled with mercury, withdrawn from the bore, but without a blister, is placed in front of a light source and an image of the bore projected onto a photosensitive device. The bore area to be contracted is then subjected to a concentrated heat source. As the glass softens and the bore begins to collapse, the projected image on the photosensitive device shrinks changing the amount of light impinging on the latter, thereby changing its electrical output. As the electrical output approaches a predetermined level, suitable control circuits actuated by the electrical output reduce and finally shut off the heat when the predetermined level is attained.

Figure 2:
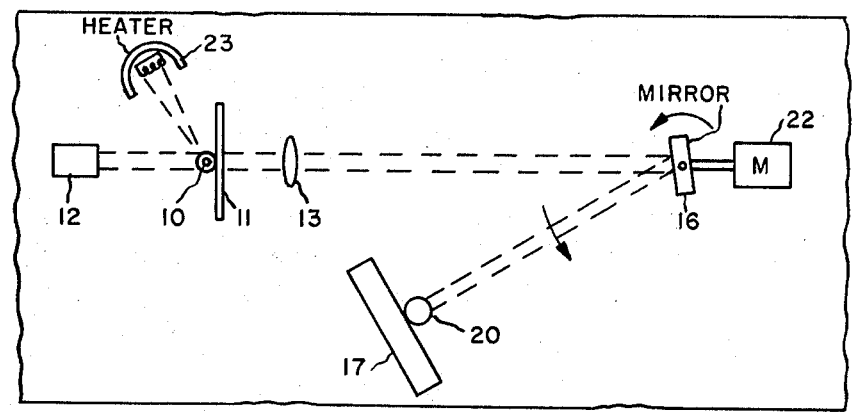
Figure 3A:
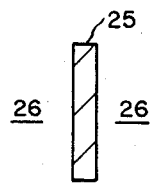
Figure 3B:
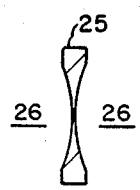
Figure 4:
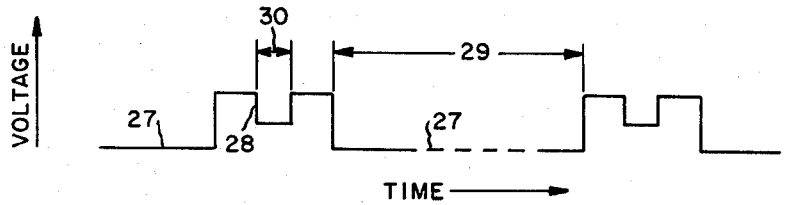

The invention will now be described in greater detail, reference being had to the accompanying drawing wherein: FIG. 1 is a partly schematic side view of one form of apparatus suitable for practicing the invention; FIG. 2 is a top view of the apparatus shown in FIG. 1; FIGS. 3a and 3b show the bore image before and after collapse; FIG. 4 is a graph of the electrical output of the photosensor as a function of time; FIG. 5 is a block diagram of the circuitry; and FIG. 6 is a more detailed schematic of the circuitry.

As stated above, the method of the invention differs from the prior art method by the absence of the blister forming step, though the steps up until the formation of the contraction remain substantially the same. That is to say, to the standard glass tubing with an internal capillary bore as obtained from a supplier is sealed the usual bulb end serving as a reservoir and the chamber head, the bore filled with mercury or like expandable fluid, the open end sealed off, and then the tubing shaken up to force the mercury into the head leaving behind in the bore a partial vacuum. Then the sealed tube 10 is placed upright in a suitable holder 11 as shown in FIG.1 with the bore portion to be contracted extending below the holder. On one side of the holder 11 is provided a suitable light source 12 of the projecting type as used, for example, in a microscope or film projector. On the other side is provided a projection lens 13. The optics is arranged so that the beam 15 from the light source impinges on the bore or tube portion to be contracted and the image thereof is projected by the lens 13 onto a mirror 16 and from the mirror onto a photosensor 20 mounted on a support or screen 17 in the path of the projected image. The mirror 16 is mounted for rotation about a vertical axis and is driven through suitable gearing 21 by a constant speed motor 22. An infrared heater 23 in the form of a high-intensity, electrically operated spot heater is positioned on the side of the optical path to provide at the bore portion to be contracted sufficient localized heating to soften the glass and cause it to contract. Actuation of the motor 22 causes the mirror 16 to be rotated causing the image of the thermometer bore projected onto it to scan across the photosensor 20. The bore shows up in the image as a shadow 25 on a bright background 26 as illustrated in FIG. 3a. The horizontal width of the shadow is proportional to the diameter of the bore. When the bore is contracted to the desired size as shown in FIG. 3b, the width of the shadow 25 is correspondingly narrowed. As the mirror rotates causing the shadow image to pass across the photosensor 20, the length of time the shadow image remains on the photosensor thus becomes proportional to its width.

The electrical output from the photosensor itself would appear as shown in FIG. 4. There is no output 27 until the mirror reaches a position where the light strikes the photosensor. The current output then builds up to a level dependent on the total light received by the photosensor as the image scans across it. The electrical output 28 reduces as the shadow image scans across the photosensor and then increases again as the bright background replaces the shadow. In effect two pulses are generated. A first insignificant very wide pulse 29 corresponding to the time when no light is impinged on the photosensor, and a second information containing narrow pulse 30 whose width is proportional to the bore width. The signal output from the photosensor is next amplified and processed to eliminate noise and the undesired pulse 29, and then integrated to convert the desired pulse width 30 into a voltage whose magnitude is proportional to the pulse width, which voltage can then be used to control the heater 23 and thus the size of the contraction. There are numerous circuit techniques that can be utilized to convert the shadow pulse width to a signal controlling the heater power, and while I will now describe a circuit which I have found to be unusually effective for the above purpose it is to be understood that my invention is not limited thereto and those skilled in the art will be able on the basis of my teachings to devise other circuits suitable to the task.

My preferred circuit is shown in block diagram in FIG. 5. The output from the photosensor 20 is amplified 50 and then passed through a threshold or discriminator circuit 55 to remove any noise. Next, the two-pulse train is applied to a pulse width selector circuit 59 designed to pass all pulses having a width smaller than the undesired wide pulse 29. The desired pulse output from the selector 59 is then integrated 69, and the D.C. signal that results is filtered 73 to remove any ripple due to the cyclic generation of the pulses and then applied to a differential amplifier circuit 75. A reference voltage that corresponds to the desired bore contraction is also applied to the differential amplifier 75, and the output thereof is thus the difference between the two voltages. That difference signal is applied to a control circuit 80 which actuates the heater 23 in accordance with the magnitude of the difference signal.

While conventional circuit elements are employed, and alternative circuits will be evident to those skilled in this art, to assist the latter in reproducing my invention, reference is had to FIG. 6 for a more detailed description of the circuit. The photosensor is a photofield-effect transistor 20 connected in a conventional pulse amplifying circuit as shown and comprising an n-n- transistor 51 connected in series with the field-effect transistor, and a p-n-p transistor 52 whose input is connected at the junction of the transistors 20 and 51. The resistors shown are conventional biasing and load resistors. The output is taken via a coupling capacitor 53. The n-p-n transistor operates as a constant current source for the field-effect transistor. By coupling the base of the output transistor 52 to the source electrode, and the emitter of the output transistor 52 to the drain electrode via the capacitor 54, the source and drain both follow the input signal increasing the speed of response of the amplifier. The resultant pulse output is a negative amplified replica of the signal in FIG. 4 and comprises a narrow and a wide pulse for each revolution of the mirror 16. It is fed to a comparator circuit 55, which may for example be a high-speed differential voltage comparator available commercially as an integrated circuit to function as a variable threshold, pulse height discriminator. The threshold is determined by a reference voltage $V_N$ supplied to the inverting input and whose value is selected to eliminate noise. The comparator also squares or sharpens the pulses. The output from comparator 55 is fed to a pulse width selector 59 whose function is to pass only the narrow pulse and thus eliminate the wide pulse. In the form shown, it comprises as a gate an AND circuit 60 to one 61 of whose inputs is supplied the wide and narrow pulses. When a signal is present at the second input 62, the next input pulse at 61 appears at the output. The control of the AND circuit 60 is effected by two monostable multivibrator circuits 63 and 64 and a flip-flop circuit 65 having three inputs T, C and S, and binary outputs of which only the 1 output is used. The C input corresponds to a clear input, the S input to a set input, and the T input to a trigger or clock input, as employed for instance in the Fairchild 931 clocked flip-flop. The multivibrator 64 has both binary 0 and 1 outputs coupled respectively to the C and S inputs of the flip-flop 65. In operation, the pulse train is supplied to the first multivibrator 63 triggering with the trailing edge of the input pulses a pulse output of small width, for example, 100 ns., chosen as the shortest convenient pulse available from commercial multivibrators, which short pulse is supplied to the T or clock input of the flip-flop. The same pulse train is also inverted in an inverter circuit 66 and then applied to the second multivibrator 64 which is designed to generate longer 250 μs. pulses. The leading edge of the input pulse when inverter triggers the second multivibrator 64 but is the wrong polarity to trigger the first multivibrator 63. The trailing edge of the pulses however do trigger the latter. It will be realized by those skilled in this art that the short pulse from the first multivibrator 63 enables the S and C inputs of the flip-flop 65, in effect interrogating the second multivibrator 64 as to whether or not 250 μs. have passed. A 100 ns. pulse is chosen since this is short compared to 250 μs., and yet is long enough to allow the flip-flop to act. The outputs from the multivibrator 64 are always present as inputs to the flip-flop 65. While the 250 μs. pulse is being generated, the 1-output of the multivibrator 64 is positive and the 0-output ground. After the 250 μs. pulse is over the 1-output becomes ground and the 0-output becomes positive. When the short pulse arrives at the T input of the flip-flip 65, the latter assumes at the end of the short pulse the output conditions commanded by the C input. For example, if the C input is positive, the 1-output of the flip-flop 65 goes positive. This therefore occurs only when the pulse outputs from the two multivibrators do not coincide in time. Conversely, when the C input is ground, the 1-output of the flip-flop goes to ground. By choosing the width of the second multivibrator pulse to be substantially larger than that of the desired pulse, with the undesired pulse having a width many times wider than either of the latter when a narrow pulse is presented having a width less than 250 μs. the flip-flop 65 is switched to the unused 0-state. With no output from the flip-flop 65 and no signal to the input 62 of the gate 60, the latter is inhibited for the next pulse, which is the undesired wide pulse. When the pulse to the multivibrators is longer than 250 μs., when the trigger pulse is present the 0-output of the multivibrator 64 is positive and the flip-flop 65 is triggered to the 1-state, the output of which fed to gate 60 enables it to pass the next pulse at the input 61, which is the desired shadow pulse. Therefore, the output of the gate 60 contains only the short pulses due to the shadow of the bore. It will be appreciated that the width of the short and long pulses depends upon the speed of rotation of the rotating mirror 16. I have found an appropriate speed to be 30 r.p.s. producing a narrow pulse corresponding to the maximum bore shadow of about 100 μs. It will be appreciated that these numbers are not critical and appropriate circuitry can readily be devised for other mirror speeds The various circuits described are conventional circuits available in integrated form from commercial suppliers.

The shadow pulse output from the gate 60 is coupled through a diode 67 into an integrating charging circuit comprising a constant current diode 68 and a capacitor 69, for example, of 1 μf., which is shunted by a high value resistor 70, for example, of 1 M ohm. The charging time of the capacitor is thus proportional to the bore width, while simultaneously it slowly discharges through the resistor 70. Thus, the voltage on the capacitor 69 will assume a value such that the input current through the diode 68 times the ratio of charge to discharge times equals the current through the shunting resistor 70, and that voltage value will be proportional to the bore width, with a ripple, in this case 30 c.p.s., corresponding to the mirror speed. This D.C. voltage output is fed to a high input impedance operational amplifier 71 serving as a buffer and the output thereof is fed to a second high gain operational amplifier 72 supplied with suitable eternal circuitry as is well known to serve as a low-pass filter to pass the D.C. but to substantially eliminate the 30 c.p.s. ripple for even the narrowest bore width. The circuit chosen had a frequency cut-off of about 10 c.p.s. Both operational amplifiers are standard integrated circuits commercially available and the external filter circuitry is also well known. The output is then fed to the heater power controller circuit forming a conventional proportional plus reset controller via a third, high-gain operational amplifier 75 supplied with external circuitry to form a conventional voltage summing amplifier circuit. The input also includes a reference voltage $E_R$ whose value is experimentally determined to give the desired bore contraction. The amplifier 75 functions to produce an output only so long as the input voltage differs from the reference $E_R$ and in proportion to that difference.

The output from the differential amplifier 75 is fed to a conventional SCR gate drive 76, commercially available, for firing silicon controlled rectifiers 77 to control the AC power to the heater 23 of the glass tubing. It will be evident from the foregoing description that power gets supplied to the heater 23 until the bore shrinks, shirinking the shadow and causing the negative D.C. voltage signal input to decrease toward the value $E_R$ at the differential amplifier 75. As the difference voltage gets smaller as the bore size approaches the desired width the power into the heater is reduced. Ultimately the difference voltage reaches zero as the desired width is achieved and the heater is shut off.

While I have described above a preferred embodiment of my invention, I wish it to be understood that my invention is not limited to the specic construction described and those skilled in the art will appreciate that various substitutions can be made without departing from the spirit and scope of my invention. Thus, for example, the infrared heater 23 can be replaced by a dielectric heater or by a flame heater and the flame temperature and magnitude controlled during the heating of the bore in the same way as the infrared version. Similarly, the photo-field-effect transistor can be replaced by a phototransistor, photodiode, photoconductive cell, photoelectric cell or television camera tube. While I have found the scanning technique with pulse circuitry to be the most accurate producing the smallest reject rate, I have also obtained acceptable results with a fixed mirror 16 and thus with the bore image constantly on the photosensor 20. In the latter case, as the shadow image shrinks, the current output from the photosensor increases, and as the increasing current approaches the reference value corresponding to the desired bore contraction, a control device can be triggered to turn off the heat. If necessary, to avoid further bore collapse after the heat is turned off due to retained heat in the glass, a stream of air can be blown on the tube to cool it down faster simultaneously with turning off of the heater.

What is claimed is:

1. A method for making a glass thermometer comprising providing glass tubing containing a bore, projecting an image of a portion of the glass tubing containing the bore onto a photosensitive device spaced from the glass tubing, heating said tubing portion until the glass softens and the bore walls collapse inward causing the electrical output from the photosensitive device to vary, and using the varied electrical output from the photosensitive device to arrest the heating when the collapsing bore walls assume a desired contraction but before the bore is completely sealed off.

2. A method for making a thermometer comprising providing sealed glass tubing containing a capillary bore having at an end an expandable fluid forming a partial vacuum within the bore, projecting a light image of a portion of the glass tubing containing the bore onto a photosensitive device producing a first signal output, locally heating said bore portion until the glass softens and the bore walls collapse inward shrinking the bore image and changing the signal output from the photosensitive device, comparing the signal output from the photosensitive device with a reference signal which corresponds to a desired contraction of the bore, reducing the heating of the bore portion as the signal output from the photosensitive device approaches the reference signal, and arresting the heating when the signal output reaches the reference value and the collapsing bore walls assume the desired contraction but before the bore is completely sealed off.

3. A method as set forth in claim 2 wherein the bore portion is heated by infrared heating.

4. A method as set forth in claim 2 wherein the electrical output from the photosensitive device and the reference signal are applied to a differential amplifier which produces an output depending on the difference between the two values, and the differential output signal is used to control the heating of the bore portion in accordance with its magnitude.

5. A method as set forth in claim 2 wherein the image of the bore is cyclically scanned across the photosensitive device producing a pulse whose width is proportional to the bore diameter, converting the pulse width corresponding to the bore diameter to a voltage magnitude, and controlling the heating of the said tubing portion by the difference between said voltage magnitude and a reference voltage.

6. Apparatus for making a clinical thermometer comprising means for supporting a sealed glass tubing containing a capillary bore having at an end an expandable fluid forming a partial vacuum within the bore, a photosensitive device, means for projecting a light image of a portion of the tubing containing the bore onto the photosensitive device producing a first signal output, means for heating said bore portion at a temperature at which the glass softens and the bore walls collapse inward changing the signal output from the photosensitive device, means coupled to the photosensitive device for comparing the signal output from the photosensitive device with a reference value corresponding to a desired contraction of the bore walls but before the bore is completely sealed off, and means coupling the comparing means and the heating means for arresting the heating when the signal output substantially matches the reference value.

7. Apparatus as set forth in claim 6 and including means in the optical path for causing the bore image to cyclically scan across the photosensitive device producing a narrow pulse corresponding to the bore diameter and a wide pulse, and means reseponsive only to the narrow pulse and coupled to the heating means for controlling the latter.

8. Apparatus as set forth in claim 7 wherein the scanning means comprises a rotating mirror.

9. Apparatus as set forth in claim 8 and including means for converting the width of the narrow pulse into a voltage magnitude, a differential amplifier having an input and output, means for coupling the voltage magnitude and a reference voltage corresponding to the desired contraction to the input of the differential amplifier, and means coupling the output of the differential amplifier to the heater means to control the latter in proportion to the difference between the two input voltages.

10. Apparatus as set forth in claim 7 and including gate means responsive to the presence of the wide pulse for passing the narrow pulse, and means for integrating the narrow pulses that pass through the gate means.

References Cited

UNITED STATES PATENTS

| | | | |
|---|---|---|---|
| 2,101,673 | 12/1937 | Newmann | 65—276 |
| 2,890,347 | 6/1959 | McCormick | 65—158 |

S. LEON BASHORE, Primary Examiner

E. R. FREEDMAN, Assistant Examiner

U.S. Cl. X.R.

65—62, 64, 158, 162, 276; 250—219